(12) United States Patent
Tomura

(10) Patent No.: US 8,760,052 B2
(45) Date of Patent: Jun. 24, 2014

(54) INDICATOR LAMP LIGHTING CIRCUIT FOR VEHICLE

(75) Inventor: Kazuyoshi Tomura, Shimada (JP)

(73) Assignee: Yazaki Corporation, Tokyo (JP)

( * ) Notice: Subject to any disclaimer, the term of this patent is extended or adjusted under 35 U.S.C. 154(b) by 113 days.

(21) Appl. No.: 13/599,274

(22) Filed: Aug. 30, 2012

(65) Prior Publication Data

US 2013/0049583 A1 Feb. 28, 2013

(30) Foreign Application Priority Data

Aug. 31, 2011 (JP) .................. 2011-189037

(51) Int. Cl.
*H05B 37/02* (2006.01)
*G08B 5/36* (2006.01)

(52) U.S. Cl.
USPC ............................. 315/77; 315/134

(58) Field of Classification Search
USPC ............ 315/77, 129, 130, 133, 134; 340/641, 340/933
See application file for complete search history.

(56) References Cited

U.S. PATENT DOCUMENTS 3,416,131 A * 12/1968 MacKenzie et al. .......... 340/450
3,593,270 A * 7/1971 Walker et al. ................ 340/450
3,631,440 A * 12/1971 Cliffgard ...................... 340/622

FOREIGN PATENT DOCUMENTS

JP 2002-29364 A 1/2002

* cited by examiner

*Primary Examiner* — Daniel D Chang
(74) *Attorney, Agent, or Firm* — Sughrue Mion, PLLC

(57) ABSTRACT

If a state to be informed occurs during an on-state of an ignition switch of a vehicle, a first and a second switching transistor are turned on by a control signal of a signal line, and an indicator lamp is lighted by power from a meter power supply. In addition, a third and a fourth switching transistor are turned on by a sub control signal of the signal line during an off-state of the ignition switch, and the indicator lamp is lighted by power from a continuous power supply.

2 Claims, 2 Drawing Sheets

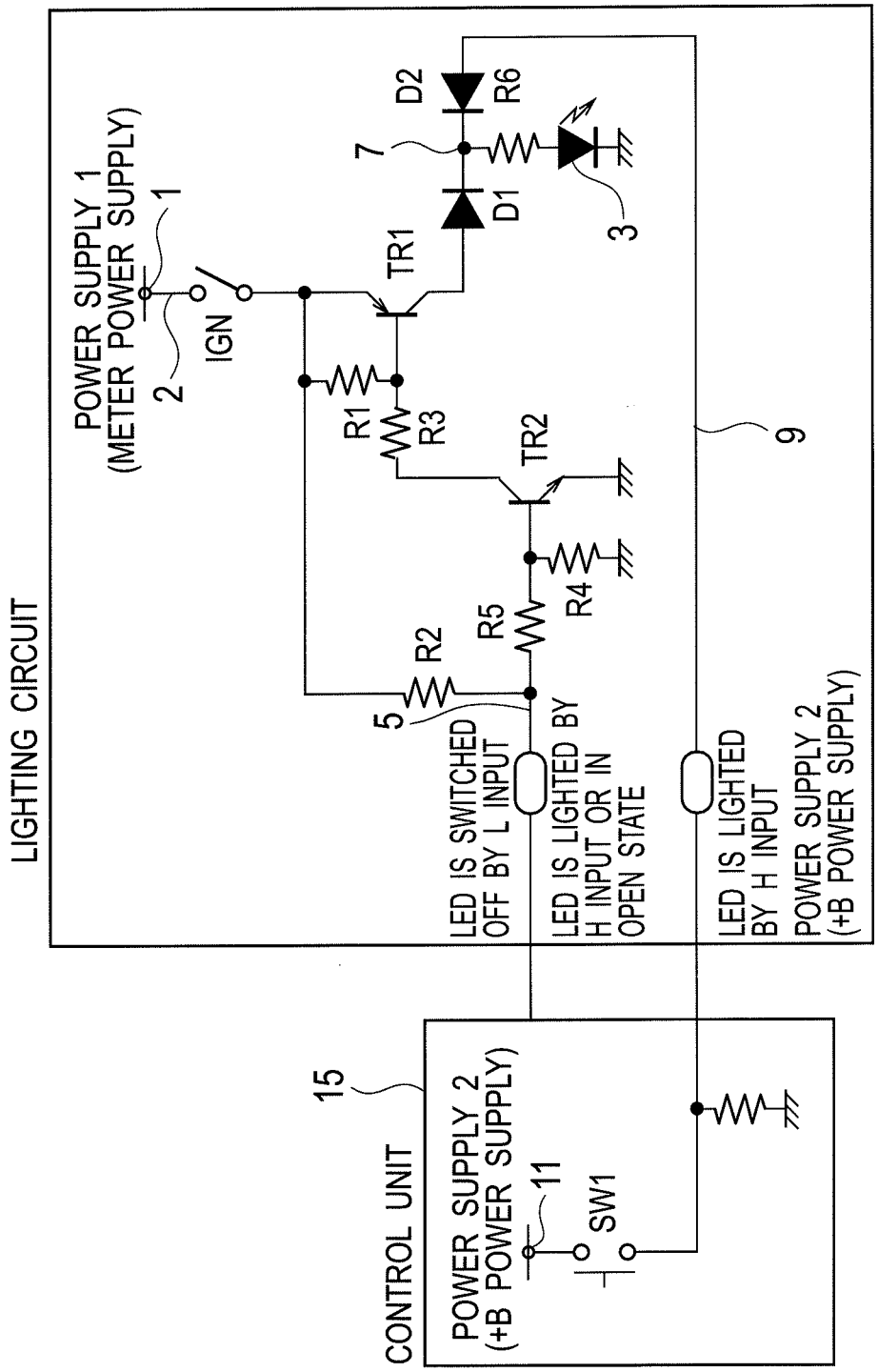

INDICATOR LAMP LIGHTING CIRCUIT FOR VEHICLE

CROSS REFERENCE TO RELATED APPLICATION

This application claims benefit of priority under 35 U.S.C. §119 to Japanese Patent Application No. 2011-189037, filed on Aug. 31, 2011, the entire contents of which are incorporated by reference herein.

BACKGROUND OF THE INVENTION

1. Field of the Invention

The present invention relates to a lighting circuit of an indicator lamp used for informing various states in a combination meter of a vehicle, etc.

2. Description of the Related Art

An indicator lamp informs various states in a combination meter of a vehicle. In this case, a switching transistor is provided on a feed circuit of the indicator lamp connected to a battery by switching on an ignition switch. The switching transistor is turned on/off by a control signal whose signal state changes according to a state to be informed.

It is to be noted that such an indicator lighting circuit also includes an indicator lighting circuit that pulls up a base potential of a switching transistor by power supply of the switching transistor to light an indicator lamp even in an open state of a signal line so as to be able to inform a state by the indicator lamp also at the time of disconnection of the signal line for the control signal (for example, Japanese Patent Application Laid-Open Publication No. 2002-29364).

Since the base potential of the switching transistor is pulled up by the power supply in the above-mentioned lighting circuit, the indicator lamp can inform the state only while an ignition switch is switched on, i.e., while the switching transistor is connected to the power supply.

SUMMARY OF THE INVENTION

The present invention has been made in view of the above-described circumstances, and an object of the present invention is to provide an indicator lamp lighting circuit for a vehicle that can light as needed an indicator lamp for informing a vehicle state or an open state of a signal line for a control signal used to inform a state when an ignition switch of a vehicle is on, also when the ignition switch is off.

An indicator lamp lighting circuit for a vehicle of the present invention that achieves the above-mentioned object has been devised in consideration of the following circumstances.

For example, when notification of a state that is informed by an indicator lamp in a meter unit is performed by a control signal from a control unit (ECU) of the vehicle, a signal line for the control signal is connected to a base of a switching transistor. As a result of this, the control signal can be used for a bias of a base potential to turn on/off the switching transistor.

Here, when disconnection or poor connection occurs in the signal line, it becomes impossible to properly inform a state to be informed by the indicator lamp. Consequently, it is important to check whether or not the signal line is in the open state due to disconnection or poor connection in an assembly process of a combination meter.

When checking the open state of the signal line in the assembly process, it is necessary to confirm whether or not the indicator lamp actually lights by trying to light the indicator lamp. However, when the indicator lamp informs an abnormal state by lighting thereof, the indicator lamp cannot be lighted by the control signal unless the abnormal state can be artificially made to occur at the time of checking.

Consequently, it is considered to pull up the base potential of the switching transistor so that the switching transistor is turned on even when the signal line becomes the open state due to disconnection or poor connection.

In this case, when an ignition power supply (meter power supply) connected to a meter unit at the time of an on-state of the ignition switch is used for a pull-up power supply, the base potential of the switching transistor can be pulled up to light the indicator lamp during the on-state of the ignition switch. In other words, the indicator lamp cannot be lighted during an off-state of the ignition switch even if disconnection or poor connection does not occur in the signal line.

Consequently, it is considered to bias the base potential of the switching transistor by supplying a current from a continuous power supply (+B power supply) to a feed circuit of the indicator lamp at the time of the off-state of the ignition switch. In this case, the +B power supply is connected to the feed circuit of the indicator lamp without via the ignition switch. Accordingly, if disconnection or poor connection does not occur in the signal line, even during the off-state of the ignition switch, the indicator lamp can be lighted to thereby confirm the non-occurrence.

However, since bias resistances including a pull-down resistance exist around the base of the switching transistor, a dark current always flows in the feed circuit through these bias resistances when the +B power supply is directly connected to the feed circuit. Since battery charge by an alternator is not performed during the off-state of the ignition switch, it is not preferable that the dark current is caused to continue to flow in the above state because of leading to acceleration of battery consumption.

According to one aspect of the present invention, there is provided an indicator lamp lighting circuit for a vehicle including: a first switching transistor which is provided on a feed path from an ignition power supply to an indicator lamp to supply power during an on-state of an ignition switch of a vehicle, and in which electrical conduction is established between an emitter and a collector thereof when a bias is applied to a base thereof pulled up by the ignition power supply during the on-state of the ignition switch; a second switching transistor which is provided between the base of the first switching transistor and ground, and in which electrical conduction is established between an emitter and a collector thereof when a bias is applied to a base thereof pulled up by the ignition power supply during the on-state of the ignition switch; and a signal line for a control signal connected to the base of the second switching transistor. Moreover, the control signal is used to apply a bias potential to the base of the second switching transistor during occurrence of a state to be informed by lighting of the indicator lamp, and is used to apply a non-bias potential to the base of the second switching transistor during non-occurrence of the state, and that a connection point of the first switching transistor and the indicator lamp is selectively connected to a continuous power supply of the vehicle.

According to the indicator lamp lighting circuit for a vehicle in accordance with one aspect of the present invention, since the control signal has the non-bias potential and the bias is not applied to the base of the second switching transistor when the state to be informed does not occur during the on-state of the ignition switch, electrical conduction between the emitter and collector of the second switching transistor becomes off.

As a result of this, a bias is not applied to the base of the first switching transistor, either, and electrical conduction between the emitter and collector of the first switching transistor becomes off. Consequently, the indicator lamp is not lighted.

Meanwhile, since the control signal has the bias potential and the bias is applied to the base of the second switching transistor when the state to be informed occurs during the on-state of the ignition switch, electrical conduction between the emitter and collector of the second switching transistor becomes on.

In addition, since the bias is applied to the base of the second switching transistor by pull-up using the ignition power supply when the signal line for the control signal becomes an open state during the on-state of the ignition switch, electrical conduction between the emitter and collector of the second switching transistor becomes on.

Accordingly, in these cases, electrical conduction between the emitter and collector of the second switching transistor becomes on, whereby a reverse bias is applied to the base of the first switching transistor, and electrical conduction between the emitter and collector of the first switching transistor also becomes on. Consequently, the indicator lamp is lighted.

Meanwhile, since the base of the second switching transistor is not pulled up by the ignition power supply during the off-state of the ignition switch, a bias is not applied to the base of the second switching transistor, and electrical conduction between the emitter and collector of the second switching transistor becomes off.

As a result of this, a bias is not applied to the base of the first switching transistor, either, and electrical conduction between the emitter and collector of the first switching transistor becomes off. Consequently, when the control signal is fixed to the non-bias potential during the off-state of the ignition switch, the indicator lamp cannot be lighted during the off-state of the ignition switch by the control signal or the ignition power supply.

However, if the +B power supply (continuous power supply) of the vehicle is connected to a connection point of the first switching transistor and the indicator lamp, the indicator lamp is lighted by power from the +B power supply (continuous power supply).

Accordingly, even during the off-state of the ignition switch where the bases of the first and second switching transistors are not pulled up, the indicator lamp can be lighted as needed utilizing the +B power supply (continuous power supply) of the vehicle.

It is to be noted that when there is a plurality of states where the indicator lamp is lighted utilizing the ignition power supply during the on-state of the ignition switch, the indicator lamp may be lighted utilizing the +B power supply (continuous power supply) during the off-state of the ignition switch only in a part of the states.

According to one aspect of the present invention, there is provided an indicator lamp lighting circuit for a vehicle further including: a third switching transistor which is provided between the continuous power supply and the connection point, and in which electrical conduction is established between an emitter and a collector thereof when a bias is applied to a base thereof pulled up by the continuous power supply; a fourth switching transistor which is provided between the base of the third switching transistor and ground, and in which electrical conduction is established between an emitter and a collector thereof when a bias is applied to a base thereof; and a signal line for a sub control signal connected to the base of the fourth switching transistor. Moreover, the sub control signal is used to switch a potential of the base of the fourth switching transistor between a bias potential and a non-bias potential, and the continuous power supply is connected to the connection point during the on-state between the emitter and collector of the third switching transistor by the sub control signal having the bias potential.

According to the indicator lamp lighting circuit for a vehicle in accordance with one aspect of the present invention, since a bias is not applied to the base of the fourth switching transistor when the sub control signal has the non-bias potential during the off-state of the ignition switch, electrical conduction between the emitter and collector of the fourth switching transistor becomes off.

As a result of this, a bias is not applied to the base of the third switching transistor, either, and electrical conduction between the emitter and collector of the third switching transistor becomes off. Consequently, the +B power supply (continuous power supply) is not connected to the indicator lamp, and thus the indicator lamp is not lighted.

Meanwhile, since the bias is applied to the base of the fourth switching transistor when the sub control signal has the bias potential during the off-state of the ignition switch, electrical conduction between the emitter and collector of the fourth switching transistor becomes on.

Accordingly, electrical conduction between the emitter and collector of the fourth switching transistor becomes on, whereby the bias is applied to the base of the third switching transistor, and electrical conduction between the emitter and collector of the third switching transistor also becomes on. Consequently, the +B power supply (continuous power supply) is connected to the indicator lamp, and thus the indicator lamp is lighted. Therefore, the indicator lamp can be lighted as needed utilizing the +B power supply (continuous power supply) of the vehicle even during the off-state of the ignition switch.

According to the indicator lamp lighting circuit for a vehicle in accordance with one aspect of the present invention, the indicator lamp for informing a vehicle state or an open state of the signal line for the control signal used to inform the state can be lighted as needed utilizing the +B power supply (continuous power supply) of the vehicle even during the off-state of the ignition switch. Accordingly, the indicator lamp lighting circuit for a vehicle in accordance with one aspect of the present invention is extremely useful for utilizing the indicator lamp used for informing a vehicle state, etc. when the ignition switch of the vehicle is on, also when the ignition switch is off.

BRIEF DESCRIPTION OF THE DRAWINGS

FIG. 3 is a circuit diagram showing a configuration when +B power supply (continuous power supply) is selectively supplied from a control unit of a supply source of a control signal to the indicator lamp lighting circuit for a vehicle shown in FIG. 1.

DESCRIPTION OF THE EMBODIMENTS

Figure 1:
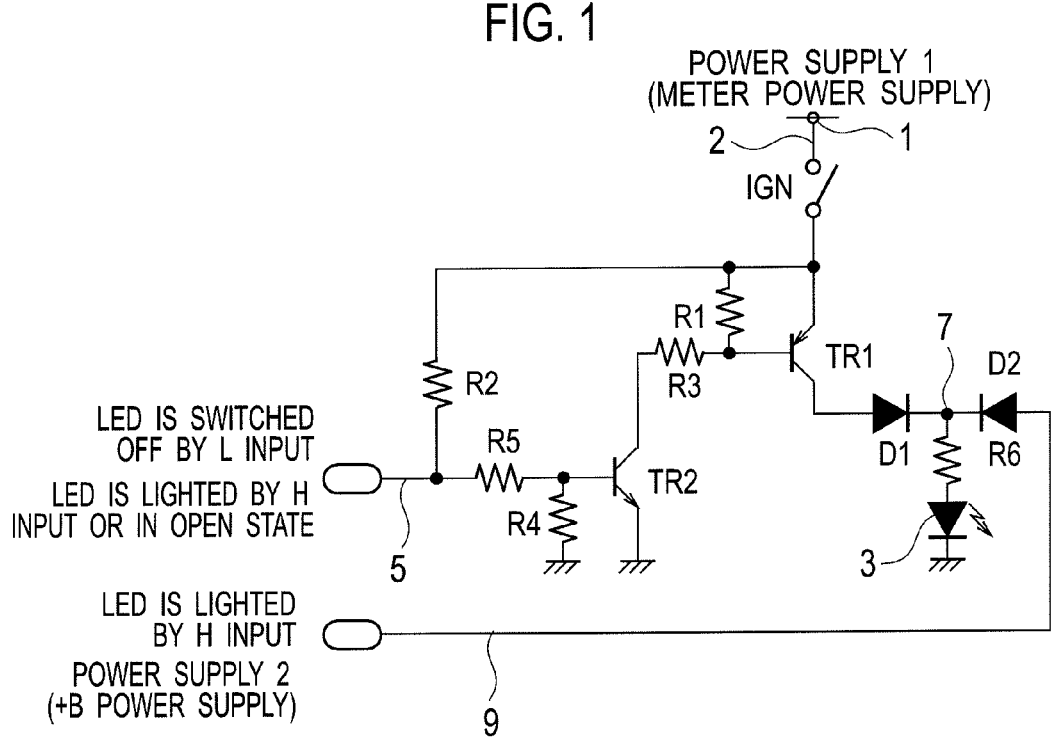
FIG. 1 is a circuit diagram showing a principled configuration of an indicator lamp lighting circuit for a vehicle in accordance with one embodiment of the present invention.

Hereinafter, an embodiment of the present invention will be described with reference to drawings. FIG. 1 is a circuit diagram showing a principled configuration of an indicator lamp lighting circuit for a vehicle in accordance with one embodiment of the present invention.

The indicator lamp lighting circuit for a vehicle (hereinafter may be abbreviated as a "lighting circuit") of the embodiment is a circuit that lights an indicator lamp (LED) 3 by power from an ignition power supply (meter power supply, power supply 1 in FIG. 1) 1 supplied at the time of an on-state of an ignition switch IGN. Additionally, the lighting circuit of the embodiment has a first and a second switching transistor TR1 and TR2.

The first switching transistor TR1 is a bipolar transistor of PNP junction. An emitter of the first switching transistor TR1 is connected to the meter power supply (power supply 1) 1 through the ignition switch IGN and a feed path 2. A collector thereof is connected to an anode of a diode D1 for backflow prevention. A base potential is pulled up to a collector potential by a pull-up resistance R1.

The second switching transistor TR2 is an emitter-grounded bipolar transistor of NPN junction. A collector of the second switching transistor TR2 is connected to the base of the first switching transistor TR1 through a protective resistance R3. A base is grounded through a pull-down resistance R4. In addition, a signal line 5 for a control signal is connected to the base through a bias resistance R5.

The signal line 5 is connected to an unillustrated control side (for example, an ECU of a vehicle, etc.). A control signal is output from this control side. At the control side, a state to be informed by lighting of the indicator lamp (LED) 3 is detected. In the states to be informed, for example, included are an item indicated as a warning in a combination meter of the vehicle, etc. In the embodiment, a potential of the control signal is a high potential (bias potential) during occurrence of the state to be informed, and is a low potential (non-bias potential) during non-occurrence of the state. It is to be noted that the signal line 5 is also connected to the collector of the first switching transistor TR1 through a pull-up resistance R2.

An anode of the indicator lamp (LED) 3 is connected to a cathode of the diode D1 through a protective resistance R6. A cathode of the indicator lamp (LED) 3 is grounded. A cathode of a diode D2 is connected to a connection point 7 of the protective resistance R6 and the cathode of the diode D1. A signal line 9 is connected to an anode of the diode D2. The +B power supply (continuous power supply) that is not shown is connected to this signal line 9 as needed during an off-state of the ignition switch IGN.

It is to be noted that the indicator lamp (LED) 3 and the protective resistance R6 may be arranged reversely, and the protective resistance R6 may be connected in series between the indicator lamp (LED) 3 and the ground.

In the lighting circuit of the present embodiment having the configuration described above, since the control signal of the signal line 5 has a low potential (non-bias potential) and thus a bias is not applied to the base of the second switching transistor TR2 when the state to be informed does not occur during the on-state of the ignition switch IGN, electrical conduction between the emitter and collector of the second switching transistor TR2 becomes off.

As a result of this, a bias is not applied to the base of the first switching transistor TR1, either, and electrical conduction between the emitter and collector of the first switching transistor TR1 also becomes off. Consequently, the meter power supply (power supply 1) 1 is not connected to the indicator lamp (LED) 3. Therefore, when the state to be informed does not occur during the on-state of the ignition switch IGN, the indicator lamp (LED) 3 is not lighted.

Meanwhile, since the control signal of the signal line 5 has a high potential (bias potential) and thus a forward bias is applied to the base of the second switching transistor TR2 when the state to be informed occurs during the on-state of the ignition switch IGN, electrical conduction between the emitter and collector of the second switching transistor TR2 becomes on.

In addition, since the forward bias is applied to the base of the second switching transistor TR2 by pull-up using the meter power supply (power supply 1) 1 when the signal line 5 becomes an open state due to disconnection, poor connection, etc. during the on-state of the ignition switch IGN, electrical conduction between the emitter and collector of the second switching transistor TR2 becomes on.

Accordingly, in these cases, electrical conduction between the emitter and collector of the second switching transistor TR2 becomes on, whereby a reverse bias is applied to the base of the first switching transistor TR1, and electrical conduction between the emitter and collector of the first switching transistor TR1 also becomes on. Consequently, a battery (power supply 1) 1 is connected to the indicator lamp (LED) 3. Therefore, when the state to be informed occurs during the on-state of the ignition switch IGN, or when the signal line 5 becomes the open state, the indicator lamp (LED) 3 is lighted.

In contrast to this, since the base of the second switching transistor TR2 is not pulled up by the meter power supply (power supply 1) 1 during the off-state of the ignition switch IGN, the bias is not applied to the base of the second switching transistor TR2, and electrical conduction between the emitter and collector of the second switching transistor TR2 becomes off.

As a result of this, the bias is not applied to the base of the first switching transistor TR1, either, and electrical conduction between the emitter and collector of the first switching transistor TR1 also becomes off. Consequently, the meter power supply (power supply 1) 1 is not connected to the indicator lamp (LED) 3 during the off-state of the ignition switch IGN, the indicator lamp (LED) 3 is not lighted by the meter power supply (power supply 1) 1.

Additionally, a current does not flow through the diode D2, the protective resistance R6, and the indicator lamp (LED) 3 in a state where the +B power supply (continuous power supply) that is not shown is not connected to the signal line 9. Consequently, when the +B power supply (continuous power supply) that is not shown is not connected to the signal line 9 during the off-state of the ignition switch IGN, the indicator lamp (LED) 3 is not lighted.

Meanwhile, when the +B power supply (continuous power supply) that is not shown is connected to the signal line 9 during the off-state of the ignition switch, a current flows through the diode D2, the protective resistance R6, and the indicator lamp (LED) 3. Consequently, if the +B power supply (continuous power supply) that is not shown is connected to the signal line 9 even during the off-state of the ignition switch IGN, the indicator lamp (LED) 3 is lighted by the +B power supply (continuous power supply) of the vehicle.

Accordingly, according to the lighting circuit of the embodiment, even during the off-state of the ignition switch IGN where the bases of the first and second switching transistors TR1 and TR2 are not pulled up by the meter power supply (power supply 1) 1, the indicator lamp (LED) 3 can be lighted as needed utilizing the +B power supply (continuous power supply) of the vehicle.

Figure 2:
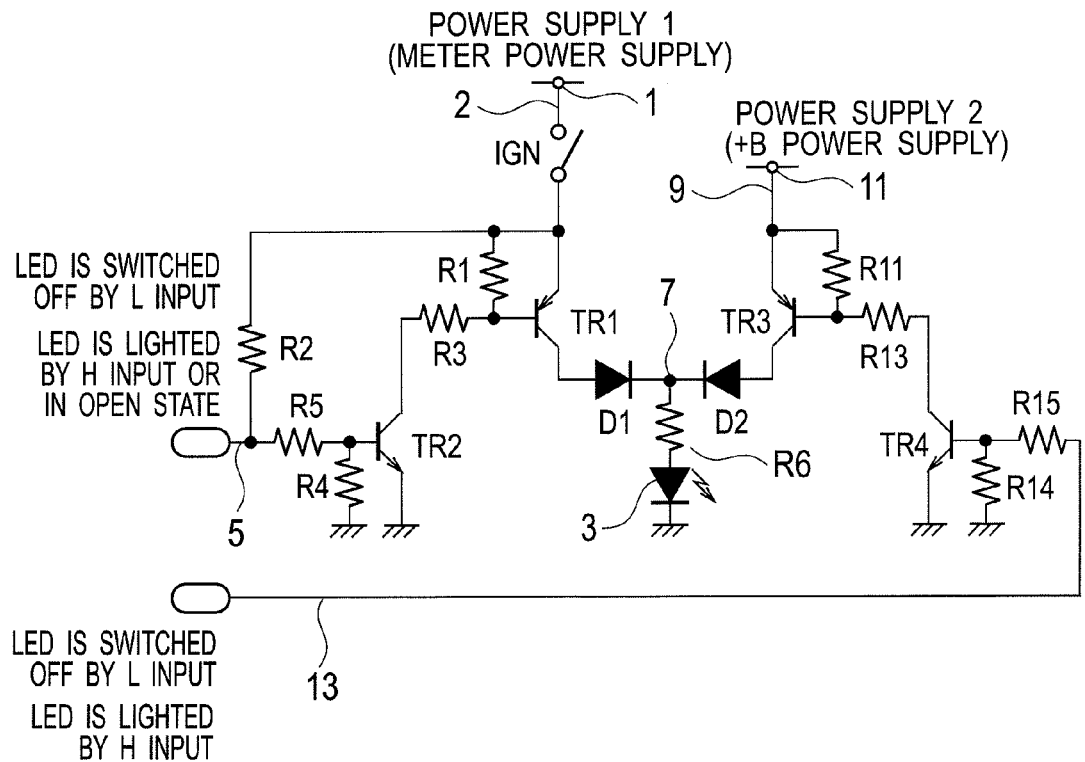
FIG. 2 is a circuit diagram showing a specific configuration of the indicator lamp lighting circuit for a vehicle in accordance with one embodiment of the present invention.

Next will be described a specific configuration example of a portion in which the +B power supply (continuous power supply) is restrictively connected to the signal line 9 when the state to be informed occurs in the above-mentioned lighting circuit of the embodiment. FIG. 2 is a circuit diagram showing a specific configuration of the indicator lamp lighting circuit for a vehicle in accordance with one embodiment of the present invention.

In the lighting circuit shown in FIG. 2, a third and a fourth switching transistor TR3 and TR4 are used in order to light the indicator lamp (LED) 3 by power from a +B power supply (continuous power supply, power supply 2 in FIG. 2) 11.

The third switching transistor TR3 is a bipolar transistor of PNP junction. An emitter of the third switching transistor TR3 is connected to the +B power supply (power supply 2) 11 through the signal line 9. A collector is connected to the anode of the diode D2 for backflow prevention. A base potential is pulled up to a collector potential by a pull-up resistance R11.

The fourth switching transistor TR4 is an emitter-grounded bipolar transistor of NPN junction. A collector of the fourth switching transistor TR4 is connected to a base of the third switching transistor TR3 through a protective resistance R13. A base is grounded through a pull-down resistance R14. In addition, a signal line 13 for a sub control signal is connected to the base through a bias resistance R15.

The signal line 13 is connected to an unillustrated control side (for example, an ECU of a vehicle, etc.). The sub control signal is output from this control side. At the control side, a state to be informed by lighting of the indicator lamp (LED) 3 is detected. In the states to be informed, for example, included is an item indicated as a warning in a combination meter of the vehicle, etc. In the embodiment, a potential of the sub control signal is a high potential (bias potential) during occurrence of the state to be informed, and is a low potential (non-bias potential) during non-occurrence of the state.

It is to be noted that the "states to be informed" respectively occurring when the control signal of the signal line 5 connected to the base of the second switching transistor TR2 and the sub control signal of the signal line 13 connected to the base of the fourth switching transistor TR4 have high potentials (bias potentials) may not necessarily (completely or partially) be coincided with each other.

Since in the lighting circuit shown in FIG. 2, the sub control signal of the signal line 13 has a low potential (non-bias potential) and thus a bias is not applied to the base of the fourth switching transistor TR4 when the state to be informed does not occur during the off-state of the ignition switch IGN, electrical conduction between an emitter and the collector of the fourth switching transistor TR4 becomes off.

As a result of this, a bias is not applied to the base of the third switching transistor TR3, either, and electrical conduction between the emitter and collector of the third switching transistor TR3 also becomes off. Consequently, the +B power supply (power supply 2) 11 is not connected to the indicator lamp (LED) 3 through the signal line 9. Therefore, when the state to be informed does not occur during the on-state of the ignition switch IGN, the indicator lamp (LED) 3 is not lighted.

Meanwhile, since the sub control signal of the signal line 13 has the high potential (bias potential) and thus a forward bias is applied to the base of the fourth switching transistor TR4 when the state to be informed occurs during the off-state of the ignition switch IGN, electrical conduction between the emitter and collector of the fourth switching transistor TR4 becomes on.

Accordingly, electrical conduction between the emitter and collector of the fourth switching transistor TR4 becomes on, whereby a reverse bias is applied to the base of the third switching transistor TR3, and electrical conduction between the emitter and collector of the third switching transistor TR3 also becomes on. Consequently, the +B power supply (power supply 2) 11 is connected to the indicator lamp (LED) 3.

Therefore, when the state to be informed occurs during the off-state of the ignition switch IGN, the indicator lamp (LED) 3 is lighted.

It is to be noted that in the lighting circuit shown in FIG. 2, a configuration has been employed in which the +B power supply (power supply 2) 11 is selectively connected to the indicator lamp (LED) 3 using the third and fourth switching transistors TR3 and TR4. However, the lighting circuit itself does not need to have a configuration in which the +B power supply (power supply 2) 11 is selectively connected to the indicator lamp (LED) 3.

For example, as shown in the circuit diagram of FIG. 3, provided is a port for outputting the +B power supply (power supply 2) 11 to a control unit 15 that supplies a control signal to the signal line 5 of the lighting circuit shown in FIG. 1 at the time of an on-state of an internal switch SW1, and the signal line 9 of the lighting circuit may be connected to this port.

In this case, even though the control signal for the signal line 5 has the low potential (non-bias potential, a state where the state to be informed does not occur) during the off-state of the ignition switch IGN, the control unit 15 can switch on the internal switch SW1, selectively connect the +B power supply (power supply 2) 11 to the signal line 9, and light the indicator lamp (LED) 3 by its own control.

It is to be noted that although the case where the indicator lamp 3 is an LED (light emitting diode) has been described as an example, the indicator lamp may be a valve or another light emitter (lamp).

What is claimed is:

1. An indicator lamp lighting circuit for a vehicle, comprising:
a first switching transistor which is provided on a feed path from an ignition power supply to an indicator lamp to supply power during an on-state of an ignition switch of a vehicle, and in which electrical conduction is established between an emitter and a collector thereof when a bias is applied to a base thereof pulled up by the ignition power supply during the on-state of the ignition switch;
a second switching transistor which is provided between the base of the first switching transistor and ground, and in which electrical conduction is established between an emitter and a collector thereof when a bias is applied to a base thereof pulled up by the ignition power supply during the on-state of the ignition switch; and
a signal line for a control signal connected to the base of the second switching transistor,
wherein
the control signal is used to apply a bias potential to the base of the second switching transistor during occurrence of a state to be informed by lighting of the indicator lamp, and is used to apply a non-bias potential to the base of the second switching transistor during non-occurrence of the state, and
a connection point of the first switching transistor and the indicator lamp is selectively connected to a continuous power supply of the vehicle.

2. The indicator lamp lighting circuit for a vehicle according to claim 1, further comprising:
a third switching transistor which is provided between the continuous power supply and the connection point, and in which electrical conduction is established between an emitter and a collector thereof when a bias is applied to a base thereof pulled up by the continuous power supply;
a fourth switching transistor which is provided between the base of the third switching transistor and ground, and in which electrical conduction is established between an emitter and a collector thereof when a bias is applied to a base thereof; and a signal line for a sub control signal connected to the base of the fourth switching transistor, wherein the sub control signal is used to switch a potential of the base of the fourth switching transistor between a bias potential and a non-bias potential, and the continuous power supply is connected to the connection point during the on-state between the emitter and the collector of the third switching transistor by the sub control signal having the bias potential.

* * * * *